US012429365B2

(12) United States Patent
Gopinath et al.

(10) Patent No.: US 12,429,365 B2
(45) Date of Patent: Sep. 30, 2025

(54) QUANTUM SENSING AND COMPUTING USING CASCADED PHASES

(71) Applicant: The Regents of the University of Colorado, Denver, CO (US)

(72) Inventors: Juliet Gopinath, Boulder, CO (US); Lior Cohen, Denver, CO (US); Gregory Krueper, Boulder, CO (US)

(73) Assignee: The Regents of the University of Colorado, Denver, CO (US)

( * ) Notice: Subject to any disclaimer, the term of this patent is extended or adjusted under 35 U.S.C. 154(b) by 30 days.

(21) Appl. No.: 18/491,561

(22) Filed: Oct. 20, 2023

(65) Prior Publication Data

US 2024/0183692 A1   Jun. 6, 2024

Related U.S. Application Data

(60) Provisional application No. 63/427,396, filed on Nov. 22, 2022, provisional application No. 63/417,936, filed on Oct. 20, 2022.

(51) Int. Cl.
*G01D 5/353* (2006.01)
*G06N 10/40* (2022.01)

(52) U.S. Cl.
CPC ..... *G01D 5/35329* (2013.01); *G01D 5/35303* (2013.01); *G01D 5/35335* (2013.01); *G06N 10/40* (2022.01)

(58) Field of Classification Search
CPC .......... G01D 5/35329; G01D 5/35303; G01D 5/35335; G06N 10/40; G01J 9/02;
(Continued)

(56) References Cited

U.S. PATENT DOCUMENTS 5,402,231 A * 3/1995 Udd .................... G01M 5/0016
356/466
2010/0157310 A1* 6/2010 Bennett ................ H04L 9/0858
356/365
2024/0241423 A1* 7/2024 Spagnolo .............. G06N 10/40

FOREIGN PATENT DOCUMENTS

CN       101738215 A  *  6/2010  .............. G01D 5/26
CN       205825899 U  * 12/2016  .............. G01B 9/02
CN       111896123 A  * 11/2020  .............. G01J 9/02

OTHER PUBLICATIONS

20. Krueper, G., Cohen, L., & Gopinath, J. T. (2025). Cascaded multiparameter quantum metrology. Physical Review. A/Physical Review, A, 111(1). (Year: 2025).*
(Continued)

*Primary Examiner* — Tarifur R Chowdhury
*Assistant Examiner* — Kaitlyn E Kidwell
(74) *Attorney, Agent, or Firm* — Jennifer L. Bales; Macheledt Bales LLP

(57) ABSTRACT

A system for sensing phase changes in a medium includes a bidirectional interferometer having a reference arm and a sensing arm, two inputs at each of the two ends of the interferometer, and a circulator disposed between each input and the interferometer. Sources provide squeezed state pulses at an input at each end of the interferometer. Spaced-apart partial reflectors are disposed along the arms. There are detectors associated with each input. The circulators pass the squeezed state pulses into the interferometer and route reflections of the pulses to the detectors. Classical pulses may provided at the other input at each end of the interferometer.

19 Claims, 8 Drawing Sheets

(58) Field of Classification Search
CPC ....... G01J 2009/0203; G01J 2009/0226; G01J 2009/0288
See application file for complete search history.

(56) References Cited

OTHER PUBLICATIONS

21. Malitesta, M., Smerzi, A., & Pezzà, L. (2023). Distributed quantum sensing with squeezed-vacuum light in a configurable array of Mach-Zehnder interferometers. Physical Review. A/Physical Review, A, 108(3). (Year: 2023).*
22. Valeri, M., Cimini, V., Piacentini, S., Ceccarelli, F., Polino, E., Hoch, F., Bizzarri, G., Corrielli, G., Spagnolo, N., Osellame, R., & Sciarrino, F. (2023). Experimental multiparameter quantum metrology in adaptive regime. Physical Review Research, 5(1). (Year: 2023).*

* cited by examiner

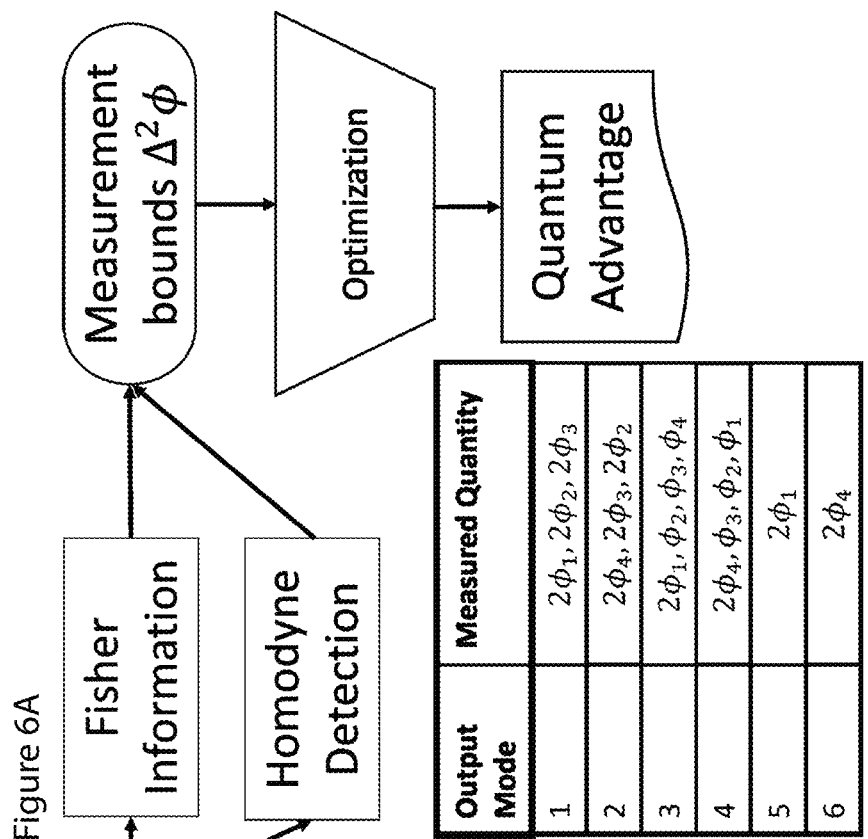
Figure 6A
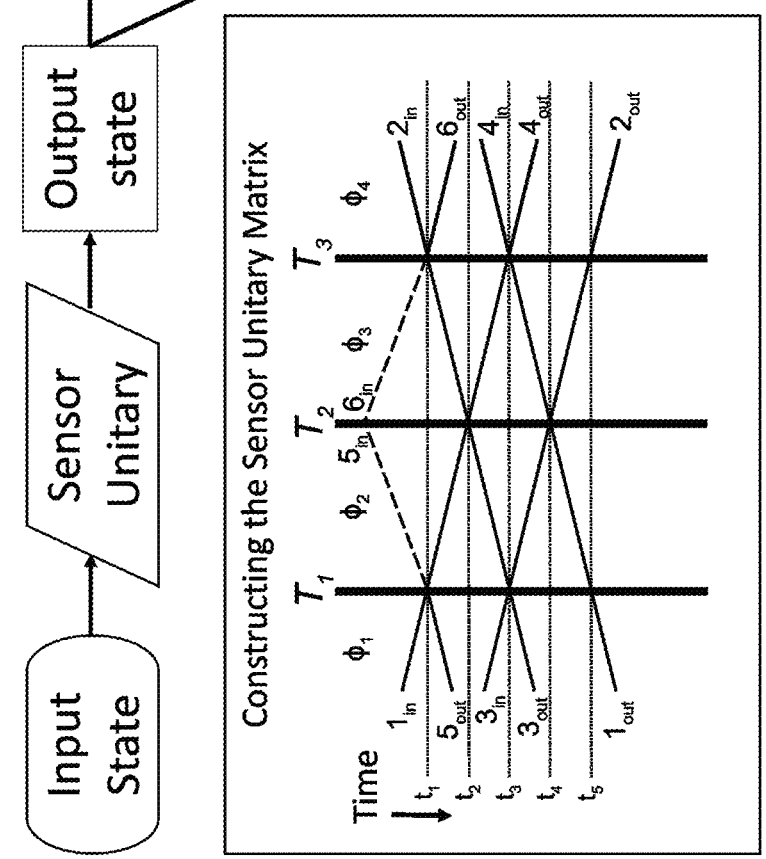
Figure 6B
Figure 6C

QUANTUM SENSING AND COMPUTING USING CASCADED PHASES

STATEMENT RELATED TO FEDERALLY FUNDED RESEARCH

This invention was made with government support under grant number 1838435 awarded by the National Science Foundation, and grant number DE-AR0001152 awarded by the US Department of Energy. The government has certain rights in the invention.

App. no. 63/417,936 filed 20 Oct. 2022 and app. no. 63/427,396 filed 22 Nov. 2022 are incorporated herein by reference.

BACKGROUND

Field

The present invention relates generally to optical sensing, and more specifically to an optical fiber sensor system for quantum metrology.

Background

Optical interferometry is commonly used in a wide variety of sensors due to its inherent precision. For instance, optical fiber sensors performing remote, distributed measurements on temperature and strain approach sensitivity regimes that are shot-noise limited (see, for example, Wu, et al., "Quasi-distributed fiber-optic acoustic sensing system based on pulse compression technique and phase-noise compensation," Optics Letters 44, 5969 (2019)).

Classical fiber sensors suffer from a loss of signal-to-noise at long ranges, particularly in distributed optical time domain reflectometry (OTDR). OTDR and its variants could benefit greatly from improved sensitivity and/or range for seismic monitoring or geological surveying. Some optical interferometry-based sensors are so sensitive that they are also close to shot noise limitations, meaning that they are constrained by limitations imposed by quantum mechanics.

Improvements are needed to provide sensors with even higher sensitivity measurements than possible with existing sensor technologies.

BRIEF DESCRIPTION OF THE DRAWINGS

FIG. 6A is a process diagram of how sensor performance is simulated using Gaussian states. FIG. 6B shows a representative unitary matrix. FIG. 6C shows a table of output modes.

FIG. 9A plots reflectivity versus number of phases, FIG. 9B plots required photon number versus number of phases, and FIG. 9C plots distribution of phase sensitivity.

SUMMARY

Figure 1:
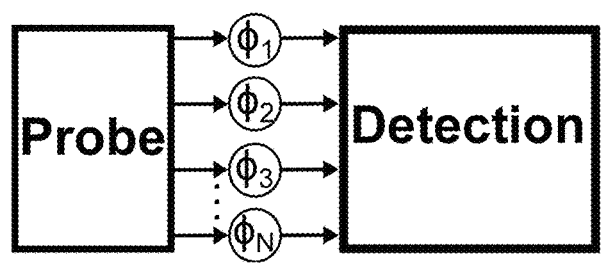
FIG. 1 is a schematic block diagram showing a parallel method for sensing multiple parameters wherein a probe is split into many channels with spatial multiplexing.

Embodiments of a system for sensing phase changes in a medium use a bidirectional interferometer having a reference arm and a sensing arm, with two inputs at each end of the interferometer, and a circulator between each input and the interferometer.

Sources provide squeezed light pulses at a first input at each end of the interferometer. Each arm of the interferometer has partial reflectors spaced along it. Generally the partial reflectors on each arm are similar and have similar spacing. In some cases the reference arm and the sensing arm are common, so the partial reflectors are also common.

Detectors associated with each input, and the circulators pass the squeezed light pulses from the sources to the interferometer and route reflections of pulses to the detectors.

Sources of classical pulses are provided at the second input at each end of the interferometer, and the circulators also pass the classical pulses to the interferometer. The classical pulses and the squeezed light pulses combine to form squeezed laser light.

In some embodiments the interferometer is a Mach-Zehnder interferometer having a fiber sensing arm and a fiber reference arm. Generally wherein similar partial reflectors are disposed with similar spacing along each arm.

In other embodiments the sensing arm and the reference arm are common. There are polarizing beam splitters configured to combine the light pulses from the inputs and to separate outputs into orthogonal polarizations.

The squeezed light pulses may be provided by a cavity-based generator of squeezed vacuum pulses, such as an optical parametric oscillator. A pulse picker may be used to provide alternating squeezed vacuum pulses to the first input at each of the two ends of the interferometer. A laser generates the classical pulses and a beam splitter provides classical pulses to the second input at each of the two ends of the interferometer.

As an example, the sensor might have two partial reflectors along each arm to form a three-phase sensor. In general, an N phase sensor has N−1 spaced-apart partial reflectors in each arm.

The medium being measured might be optical fiber or free space. It can be configured to measure material properties such as temperature and strain.

The detectors might be photodetectors and the system might be configured to use balanced homodyne detection.

Other embodiments replace the inputs and circulators at one end of the interferometer with mirrors.

DETAILED DESCRIPTION

The word "exemplary" is used herein to mean "serving as an example, instance, or illustration." Any embodiment described herein as "exemplary" is not necessarily to be construed as preferred or advantageous over other embodiments.

It is recognized that using quantum states of light in metrology applications may enable devices with sensitivities that surpass the shot noise limit of highly sensitive sensors. This recognition has led to the exploration of various forms of quantum-enhanced optical interferometry, sometimes referred to as quantum metrology. Some examples of applications for quantum metrology include the LIGO interferometer for gravitational wave detection, biological measurements, magnetometry, and optical gyroscopes (See, for example, T. L. S. Collaboration, "Enhanced sensitivity of the LIGO gravitational wave detector by using squeezed states of light," Nature Photonics 7, 613 (2013), Taylor, et al., "Biological measurement beyond the quantum limit," Nature Photonics 7, 229 (2013), Li, et al., "Quantum enhanced optomechanical magnetometry," Optica 5, 850 (2018), and Xiao, et al., "Enhanced phase estimation with coherently boosted two-mode squeezed beams and its application to optical gyroscopes, Physical Review A 102, 022614 (2020)).

Further, the burgeoning field of quantum metrology has recently been exploring the potential for multiparameter estimation in the form of distributed measurements (see, for example, Proctor, et al., "Multiparameter estimation in networked quantum sensors," Phys. Rev. Lett. 120, 080501 (2018), Gatto, et al., "Distributed quantum metrology with a single squeezed vacuum source," Phys. Rev. Research 1, 032024 (2019), and Ragy, et al., "Compatibility in multiparameter quantum metrology," Phys. Rev. A 94, 052108 (2016). However, such previous quantum metrology approaches have all measured multiple parameters in parallel, such as in phase imaging.

Instead, it is recognized herein that the measurement of multiple parameters in series, such as through a single optical fiber, provides heretofore unseen advantages over the previously considered parallel approaches. While the series approach presents technical difficulties, such as the difficulty in obtaining distinguishing information on individual phases due to the phases being highly correlated in the output, the embodiments presented herein provide advantages in sensitivity and ease of use beyond those available in previous optical interferometry systems. These devices may provide information on quantities such as strain or temperature as a function of length, and such information is critical for a variety of applications such as energy storage, disaster predictions, underground electric grid management, and more.

The series approach presented herein is referred to as cascaded phase sensing, in order to differentiate the present approach from other parallelized architectures. The term sensor and interferometer is used interchangeably in the present disclosure. In an embodiment, squeezed light may be used to provide enhanced phase sensitivity. It is noted that a variety of quantum light sources may be used with the cascaded phase sensing approach described herein.

While the improved phase sensitivity achievable with the cascaded phase sensing approach is discussed below for a two- and three-phase interferometer, the concept may be generalized to many phases, thus enabling ready scale-up of this approach. More fundamentally, the cascaded phase sensing approach enables extraction of distinguishing phase information with a quantum enhancement from highly correlated parameters. Such results are of interest for both distributed fiber sensing and quantum metrology. Further, the approach may also be used for parameter estimation in a more complex network (e.g., as discussed by Proctor, et al.), or for generating more complex states for quantum information.

FIG. 1 is a schematic block diagram showing a parallel method for sensing, wherein a probe is split into many channels with spatial multiplexing.

Figure 2:
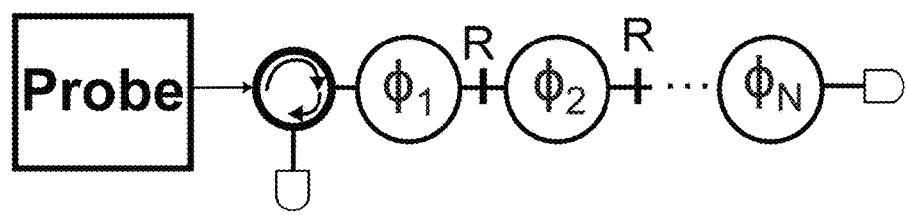
FIG. 2 is a schematic block diagram showing a cascaded architecture for sensing multiple parameters, which measures parameters in series using partial reflectors to implement time-bin multiplexing from each reflection.

FIG. 2 is a schematic block diagram showing a cascaded architecture for sensing, which measures parameters in series using partial reflectors to implement time-bin multiplexing from each reflection.

Figure 3:
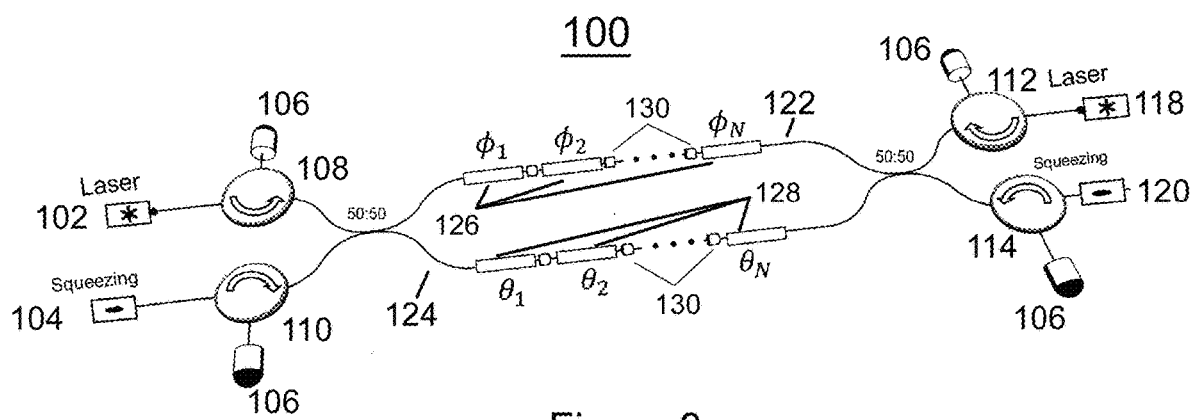
FIG. 3 is a schematic block diagram for cascaded sensing in optical fiber, having N cascaded phases separated by N−1 evenly spaced reflectors in each arm.

FIG. 3 is a schematic block diagram of an interferometer 100 for cascaded sensing in optical fiber, having N cascaded phases 126 separated by N−1 evenly spaced reflectors 130 in the reference arm 122. In an experiment modelling this embodiment, shifts were implemented with piezoelectric elements to represent strain sensing in each section. N cascaded phases 128 are separated by N−1 evenly spaced reflectors 130 of transmission T in the sensing arm 124. Balanced (50:50) couplers on either side form a Mach-Zehnder interferometer 100 with bidirectional input. Circulators 108, 110, 112, 114 ensure that the detectors only see the output state of the interferometer. On both sides, the system takes in classical laser light pulses 102, 118 (coherent states) as well as pulses 104, 120 from an external squeezed light source (not shown) to probe the interferometer 100. On each side, there are two inputs—a squeezed vacuum state, and a coherent state. When combined, they form squeezed laser light, also known as a displaced squeezed state, also known as a squeezed coherent state. The input is usually phase-squeezed. Ultimately we want phase-squeezed output from the interferometer.

Sensing multiple phase shifts that are in the same optical path may be accomplished in various ways. Transmitted light is sensitive to the sum of all the phases, whereas light reflected from a partial reflector sees a subset of those phases. One way to implement the sensor uses pulsed light and detection that resolves each reflected and transmitted pulse separately. Another alternative is with CW light that is phase-modulated at a distinct frequency for each section of the sensing arm.

For constraints on the geometry of the sensor, there is a lower bound on the separation distance between reflectors defined by the detectors' speed, or 3 dB bandwidth. The detectors should be able to distinguish between different reflections, and if they come too fast it will all wash out. For a high quantum efficiency photodiode, a conservative bandwidth is 500 MHz. If we are safely below that, (e.g. 200 Mhz), then a reflector spacing should be more than 50 cm.

There is also an upper bound on the total length of the sensor since quantum light is not really useful under, for example, more than 3 dB of loss. If in fiber, propagation loss is 0.2 dB/km, and if we have 2 dB of loss elsewhere, then the total fiber length might be limited to 5 km.

We have some tolerance on the reflectors being evenly spaced as defined by the coherence length/pulse length of our source. We are looking at pulses of length 1-3 ns long, or 20-60 cm long in fiber. Subsequent reflections should overlap multiple times, so reflectors are preferably no more than 2 cm off from their ideal position.

Figure 4A:
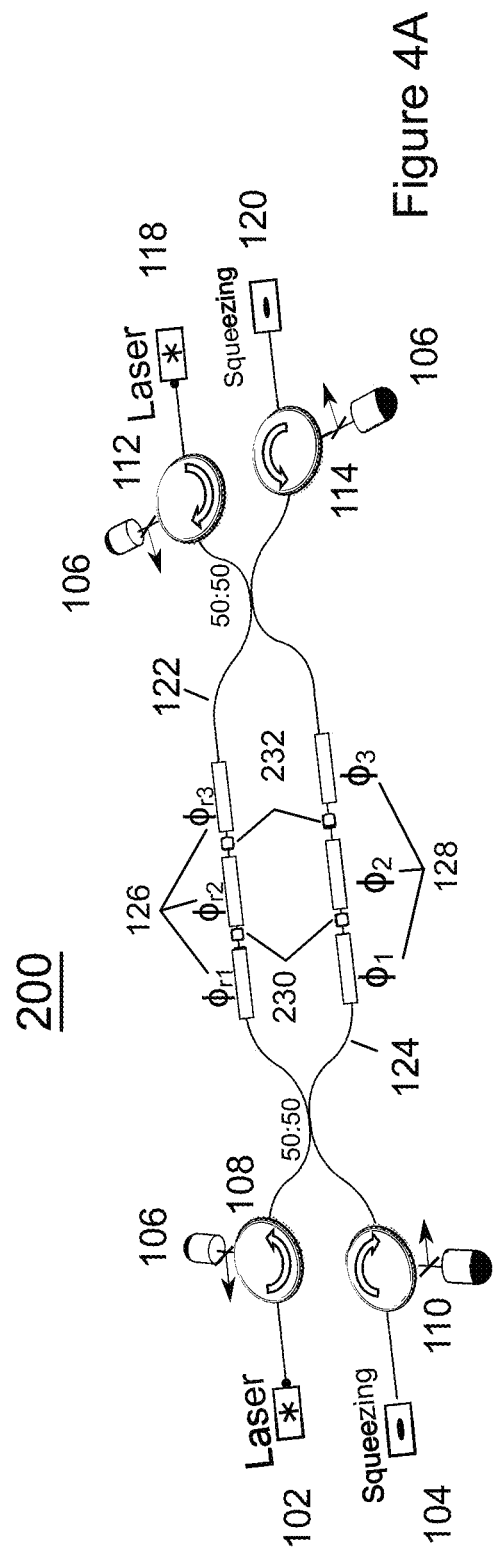
FIG. 4A is a schematic block diagram for cascaded sensing in optical fiber, having three cascaded phases separated by two evenly spaced reflectors in each arm.
Figure 4B:
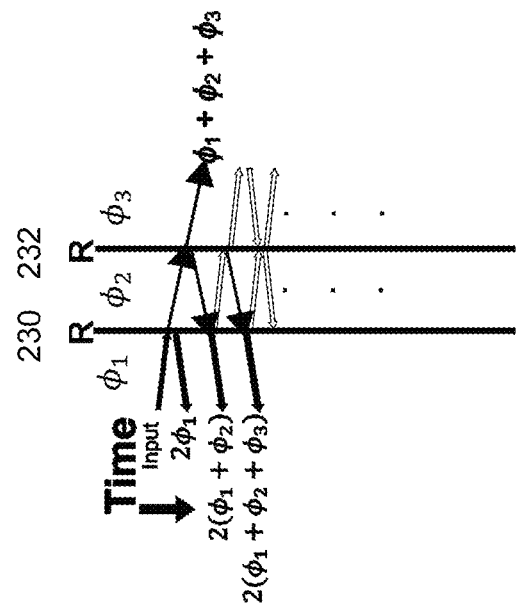
FIG. 4B is a diagram showing corresponding timing dynamics of a single pulse entering the sensing arm of this structure, the resulting reflections, and what information those reflections contain.

FIG. 4A is a schematic block diagram of a cascaded sensor 200 using optical fiber and having three cascaded phases separated by two evenly spaced reflectors in each arm. It is very similar to FIG. 3. FIG. 4B is a diagram showing corresponding timing dynamics of a single pulse entering the sensing arm of this structure, the resulting reflections, and what information those reflections contain.

Again, phase shifts might be implemented with piezoelectric elements to represent strain sensing in each section. In use, fiber sections measure changes cause by temperature, strain, etc.

Three cascaded phases are separated by two evenly spaced reflectors 230 of transmission T in the sensing arm 124 and in the reference arm 122. Balanced (50:50) couplers on either side form a Mach-Zehnder interferometer with bidirectional input. Circulators 108, 110, 112, and 114 ensure that the detectors 106 only see the output state of the interferometer 200. On both sides, the system takes in classical laser light pulses 102, 118 (coherent states) as well as pulses 104, 120 from squeezed light source to probe the interferometer.

Note that this sort of setup may be used with a mirror on one side rather than separate inputs.

The embodiment illustrated in FIG. 3 includes modifications to a traditional fiber OTDR system. For instance, instead of having only one phase sensing region in the sensing arm, N−1 Bragg reflectors separate N regions of the sensing arm, each of which N regions is associated an optical delay $\phi i$. The reference arm includes the same arrangement of reflectors for proper interference.

Further, the cascaded phase sensor of FIG. 3 is configured for receiving bidirectional input, with circulators enable detection of output signal on each side. This arrangement enables consideration of vacuum noise. For instance, each reflector essentially functions as a beam splitter with two inputs (e.g., left and right) and two outputs. Inputting squeezed light on one input and nothing (i.e., vacuum) on the other introduces vacuum noise into the output modes. One way to avoid vacuum noise is to have squeezed light on both sides of each reflector for each reflection, which may be achieved by enabling input light from both left and right. These inputs may be regarded as pulses from which timing information may be obtained. That is, as the inputs hit each reflector in sequence, the delay between pulses may be considered as being the same as the propagation delay between reflectors.

As an example, a two-phase sensor system includes a single reflector in each one of the reference and sensing arms. In such a system, two simultaneous pulses enter and interfere at a single reflector.

Figure 5:
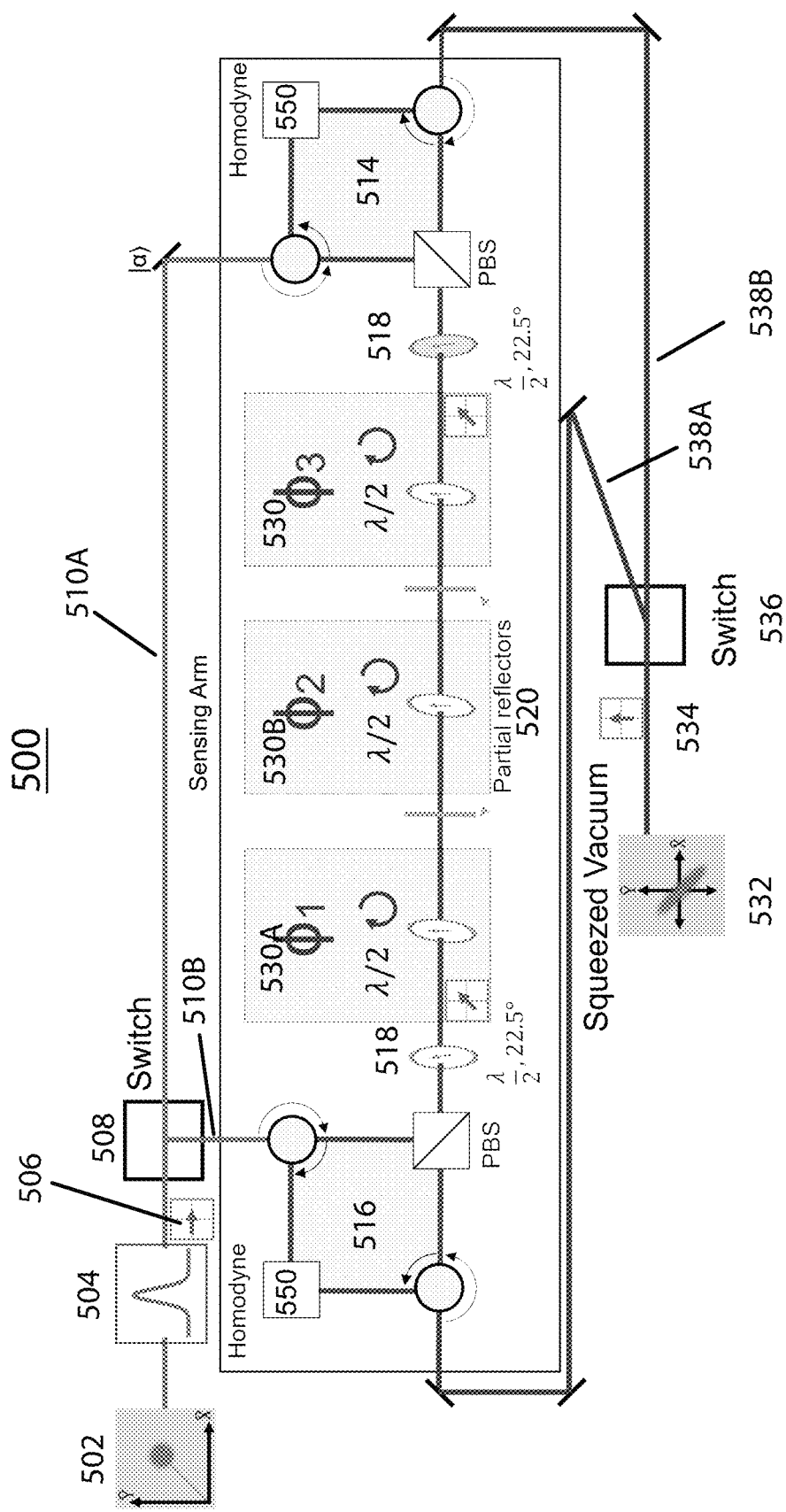
FIG. 5 is a schematic block diagram of a free-space cascaded sensor system where the sensing and reference arms are in a common mode with orthogonal polarizations.

Operation of a three-phase interferometer with two reflectors in each one of the reference and sensing arms is more complex (see FIGS. 3, 4A, and 5). In a three-phase cascaded phase sensor, the first input pulse may be from the left, and the second input may be from the right at a delayed time T such that the two inputs interfere at the rightmost reflector. A third input may be received from the left at a delayed time $2\tau$ such that the third input interferes with prior pulses on the leftmost reflector. A next, fourth pulse may then be received from the right at a delayed time $3\tau$, and so on.

FIG. 4B is a diagram showing corresponding timing dynamics of a single pulse entering the sensing arm 124 of this sensor, the resulting reflections, and what information those reflections contain.

FIG. 5 is a schematic block diagram of a free-space cascaded sensor system 500 where the sensing and reference arms are in a common mode with orthogonal polarizations via polarizers 518. Three waveplates 530A, 530B, and 530C represent the phase shifts to be measured. These are separated by partial reflectors 520 of transmission T. On either side, balanced homodyne detection assemblies 516, 514 comprise circulators and polarizing beam splitters to both let the input light 510, 538 into the interferometer 550 while also routing the output light to homodyne detectors 550. The middle 3 waveplates function as phase shifters, so that interferometer functionally senses the rotation of those waveplates.

Laser 502 and pulse carver 504 provide laser pulses to switch 508 so that pulses 510B are provided to assembly 516 and pulses 510A are provided to assembly 514. Similarly, squeezed vacuum 532 provides squeezed pulses to switch 536 so that squeezed pulses 538A are provided to assembly 516 and squeezed pulses 538B are provided to assembly 514.

FIG. 5 illustrates the layout of a free space cascaded phase sensor 500 with three phases. A coherent (classical) state 510 and a squeezed state 538 are provided to both assemblies 514, 516 of interferometer 550. Here, the signal and reference arms share a common path in orthogonal polarizations (indicated by polarization vectors 506, 534), which makes interferometer 550 more stable than a system with spatially separate arms. Waveplates 530 are used to implement the phase shifts to be measured, and are separated by (removable) partial reflectors 520. Two polarizing beam splitters in assemblies 514, 516 on either side of the interferometer combine the reference and sensing arms and send output light through the circulators into balanced homodyne detectors 550. The polarizing beam splitters combine the two inputs going into the interferometer and separate the output state into its orthogonal polarizations so that each polarization is detected separately.

Input light, both classical and quantum, is synchronized so that interference occurs. FIG. 4B shows an example of how a sequence of pulses should interfere for a three-phase interferometer.

An example of inputs into interferometer 550 might be a kHz linewidth laser 502 modulated with an acousto-optic modulator 504 (AOM) to produce one ns pulses at a 50 MHz rep rate. Switch 508 splits the light into 510A and 510B. To preserve squeezing, squeezed source 532 is not split. Instead, an acousto-optic pulse picker 536 routes (for example) every other pulse to one side of interferometer 550, and the other pulses to the other side. A temporal delay on the pulse carver may be used to ensure the pulses are sufficiently overlapped in time.

Source 532 might be a source that is transform-limited (no chirp or spectral phase) to prevent entanglement with frequency modes, which will reduce visibility. One ns pulses might be used, corresponding to a bandwidth of 300 MHz at 1550 nm. This enables dispersion of the fiber to be neglected and still provide high resolution for the sensor 500. A cavity-based source 532 provides good squeezing strength.

FIG. 6A is a process diagram of how sensor performance is simulated using Gaussian states. An input state propagates through the sensor, represented for example by a single, large unitary matrix. The resulting output state is analyzed for its Fisher information on each sensing parameter, or for its sensitivity to each parameter with homodyne detection. From there we estimate measurement sensitivity bounds on each parameter, optimize, and calculate the resulting quantum advantage.

FIG. 6B shows the unitary matrix. The unitary matrix is constructed by tracing each operation of the sensor out in time, and applying each reflection and phase shift operation in sequence. Distinguishing information on each phase is acquired through the signals of each output mode. These modes, as shown in the table of FIG. 6C, are sensitive to different combinations of phases.

The embodiment illustrated in FIG. 3 includes modifications to a traditional fiber OTDR system. For instance, instead of having only one phase sensing region in the sensing arm, N−1 Bragg reflectors separate N regions of the sensing arm, each of which N regions is associated an optical delay $\phi_i$. The reference arm includes the same arrangement of reflectors for proper interference.

It is noted that the cascaded phase sensing approach described herein provides differences from previously available layouts considered in quantum metrology. Most studies have considered the sensing of multiple parameters introduced in parallel, such as one parameter per optical mode (see, for example, Gatto, et al., "Distributed quantum metrology with a single squeezed vacuum source," Phys. Rev. Research 1, 032024 (2019); Ragy, et al., "Compatibility in multiparameter quantum metrology," Phys. Rev. A 94, 052108 (2016); You, et al., "Multiparameter estimation with single photons—linearly-optically generated quantum entanglement beats the shotnoise limit," Journal of Optics 19, 124002 (2017); Guo, et al., "Distributed quantum sensing in a continuous-variable entangled network," Nature Physics 16, 281 (2020); and Zhuang, et al., "Distributed quantum sensing using continuous-variable multipartite entanglement, Phys. Rev. A 97, 032329 (2018)). Other studies have discussed the measurement of a single parameter embedded across multiple modes (e.g., Grace, et al., "Entanglement-enhanced estimation of a parameter embedded in multiple phases, Phys. Rev. Research 3, 033114 (2021)).

In contrast, the present cascaded phase sensor has multiple parameters imparted on any temporal mode, and generally has more temporal modes than parameters. The unitary operation of the sensor is not practically invertible, unlike the parallel configurations, such that each output mode includes information on multiple parameters that are all highly correlated. These correlations, while they can be difficult to decipher, do not have to be problematic.

To show the effectiveness of the cascaded phase sensing approach, a theoretical analysis of the sensor of FIG. 3 has been performed. The modeling approach described below borrows heavily from techniques in continuous-variable quantum computing, namely the representation of Gaussian states and Gaussian operations (see, for example, Adesso, et al, "Continuous Variable Quantum Information: Gaussian States and Beyond," Open Systems and Information Dynamics, 21, 1440001 (2014); and B. Gard, LSU Doctoral Dissertations, Ph.D. thesis, Louisiana State University (2016)).

It is noted that the model presented below applies equally to metrology with classical or quantum states. The fact that the measured parameters are correlated does not necessarily hinder a squeezed input state from showing a quantum advantage.

It is noted that such squeezed states have additional degrees of freedom to manage with their squeezing strength and squeezing angle. An important aspect of the design and optimization of the sensor is to properly manage these additional degrees of freedom. As shown below with theoretical results, the cascaded phase sensing approach can nearly achieve the full quantum advantage, under the appropriate conditions.

The model described herein assumes both coherent and squeezed states of light, the intended input into the interferometer, are Gaussian. This assumption is logical, as the operations inside the sensor, phase shifts and reflections (e.g., from the beam splitters), as well as ideal homodyne detection, are all linear optics, so they preserve the Gaussian nature of the state.

A Gaussian state can be represented by a mean vector $\vec{R}$=x, y and a covariance matrix a. The vector $\vec{R}$ represents the amplitude of the state in terms of the quadrature operators $\hat{X}$ and $\hat{Y}$, which are accessible by homodyne or heterodyne detection. The matrix $\sigma$ represents the quantum noise of that state relative to the semiclassical coherent state $|\alpha\rangle$. Thus a coherent state of strength a and phase $\theta$ will have $\vec{R}=|\alpha|\cos\theta, |\alpha|\sin\theta$ and $\sigma=I$, where I is the identity matrix. In contrast, a squeezed coherent state may have the same amplitude with a different noise matrix: $\sigma_{sq}=\hat{S}(r,\chi)\widehat{S^{\dagger}}(r,\chi)$. Here, $\hat{S}(r,\chi)$ is the single-mode squeezing operator with squeezing strength r and squeezing angle $\chi$:

$$\hat{S}(r, \chi) = \begin{matrix} \cosh(r)+\cos(\chi)\sinh(r) & \sin(\chi)\sinh(r) \\ \sin(\chi)\sinh(r) & \cosh(r)-\cos(\chi)\sinh(r) \end{matrix} \quad [\text{Eq. 1}]$$

This sensor has many modes, both in space and time, and each are tracked separately in a multimode Gaussian state. An m-mode Gaussian state will have a longer mean vector $\vec{R}=\{x_1, y_1, x_2, y_2, \ldots x_m, y_m\}$ and a larger covariance matrix $\sigma_{2m,2m}$. An initial state of this form propagates through a unitary matrix U, representing the entire sensor (See the discussion associated with FIG. 6 for methods used in constructing U). The output state is then:

$$\vec{R}_{out}=U\cdot\vec{R}_{in} \quad [\text{Eq. 2}]$$

$$\sigma_{out}=U\cdot\sigma_{in}\cdot U^{\dagger}$$

Since this sensor is about multiparameter estimation, the Fisher information from a single parameter generalizes to a matrix for multiple parameters $F_{i,j}$. Diagonal elements $F_{i,i}$ indicate the amount of information obtained on a single parameter, while off-diagonal elements quantify the degree to which two parameters are correlated in the output state. Assuming homodyne detection, the Fisher information matrix with respect to parameters $\phi_i$ and $\phi_j$ of a Gaussian state takes the form (see, for example, Safranek, "Estimation of Gaussian quantum states," Journal of Physics A: Mathematical and Theoretical 52, 035304 (2019)):

$$F_{ij} = 2\frac{\partial \vec{R}^T}{\partial \phi_i}\cdot\sigma^{-1}\cdot\frac{\partial \vec{R}}{\partial \phi_j} + \frac{1}{4}Tr\left[\sigma^{-1}\cdot\frac{\partial \sigma}{\partial \phi_i}\cdot\sigma^{-1}\cdot\frac{\partial \sigma}{\partial \phi_j}\right] \quad [\text{Eq. 3}]$$

Note that Eq. 3 is the classical Fisher information obtained from ideal homodyne detection (see, for example, Oh, et al., "Optimal Gaussian measurements for phase estimation in single-mode Gaussian metrology," npj Quantum Information, 5, 10 (2019)). It is also possible that other measurements may approach the same limit with fewer samples (see, for example, Monras, "Optimal phase measurements with pure gaussian states," Phys. Rev. A 73, 033821 (2006)). The assumption of homodyne detection is used in the context of the present discussion.

From the Fisher information matrix, a lower bound on the measurement variance on each phase may be obtained via the multiparameter Cramer-Rao bound (see Ragy reference mentioned above):

$$\Delta^2 \phi_i \geq (F^{-1})_{ii} \quad \text{[Eq. 4]}$$

This definition for the lower bound on the measurement variance is similar to the single parameter case, where the variance is the inverse of the (scalar) Fisher information. For multiple parameters, this definition generalizes to the inverse of a matrix, where the diagonal entries of that inverse represent the measurement variance for each parameter, with a difference that the multiparameter case introduces correlations (i.e., off-diagonal terms in the Fisher information matrix) that generally increase the measurement variances of each parameter. In other words, if one has large Fisher information regarding two parameters, the measurement of those two parameters will still have large variance if they are highly correlated. Thus, it is not sufficient to maximize Fisher information; we must maximize distinguishing information. Consequently, the cascaded phase sensor design discussed herein is configured to obtain such distinguishing information in ways that cannot be provided by existing methods.

Finally, having obtained the set of measurement variances $\Delta^2 \phi_i$, the sum of these variances, i.e., $\text{Tr}[F^{-9}]$ should be minimized. Generally, some other linear combination of parameters may be optimized by introducing a cost function along with the Fisher information (see, for example, Szczykulska, et al., "Multiparameter quantum metrology," Advances in Physics: XI, 621 (2016)). Such an approach takes advantage of the fact that some phases are more important to measure than others. Initially, the cost function is set to the identity matrix so that every phase is equally important.

For simple cases, the optimization is over relatively few variables. For instance, the two-phase interferometer may have two inputs, which may be assumed to have equal amplitude such that $|\alpha_1|=|\alpha_2|$. The relevant variables are the phases of each input $\{\theta_1, \theta_2\}$, the squeezing angles of each input $\{\theta_{s1}, \theta_{s2}\}$, and phases to be measured $\{\phi_1, \phi_2\}$. The transmission of the reflector(s) may also be considered a variable. However, the results are shown as a function T in order to demonstrate the physics of the cascaded phase sensor.

For sensors with three phases or more, optimization requires additional considerations. The presence of multiple embedded reflectors introduces the possibility of multiple reflections, essentially forming a weak cavity within the fiber. This effect also introduces non-simultaneous input pulses, since pulses must interfere at each reflector. For the present analysis of a three-phase interferometer, the number of reflections for the last input has been truncated to seven, treating any remaining light as effectively lost.

The input pulses into the three-phase model also interfere at multiple different times, so a long coherence length is assumed. For instance, in a laboratory-scale experiment, the inter-pulse coherence length can be set by a kHz-linewidth seed laser, with a coherence length exceeding 1 km. The pulses may be 3 ns long, giving a pulse lengths of 60 cm.

It is noted that the phase $\{\phi_1, \phi_2\}$ in the present context is considered to be variables in the optimization as well as the parameters to be measured. The assumption is that those variables are near their set values, albeit with an unknown modulation to be measured. For example, $\phi_1$ may be estimated to be $\pi/2 \pm 0.1$ radians, while the measurement would yield a more exact value, within 1 milliradian or less. This assumption the same one that is made when using the Fisher information, and it is also considered logical to keep the sensor near the point where it is most sensitive to changes in parameters. The reference arm of the cascaded phase sensing system discussed herein supports this assumption, with its controllable phases $\{\phi_{c1}, \phi_{c2}, \ldots\}$. Then, the parameters actually read by the sensor may be expressed as $\{\phi_1-\phi_{c1}, \phi_2-\phi_{c2}, \ldots\}$, as is normally the case for a single-phase Mach-Zehnder interferometer.

An illustrative example of the sensor operation is its simplest non-trivial case: the two-phase interferometer. This architecture includes a single reflector and simultaneous input from the left and right. The total measurement variance as a function of reflector transmission for four different iterations are compared: 1) one input (from the left in FIG. 1) with a coherent state; 2) one input with a squeezed coherent state; 3) two inputs (from both directions) with coherent states; and 4) two inputs with squeezed coherent states. The coherent state indicates the performance of the sensor with classical light, while the squeezed coherent state indicates performance with quantum light. In the model, the squeezing parameter is set to 1 such that the maximum expected improvement in measurement variance with quantum light will be Q, the quantum advantage:

$$Q = \frac{\sum_i \Delta^2 \phi_{i,classical}}{\sum_i \Delta^2 \phi_{i,classical}} \leq e^{2r} = e^2 \quad \text{[Eq. 5]}$$

Figure 7B:
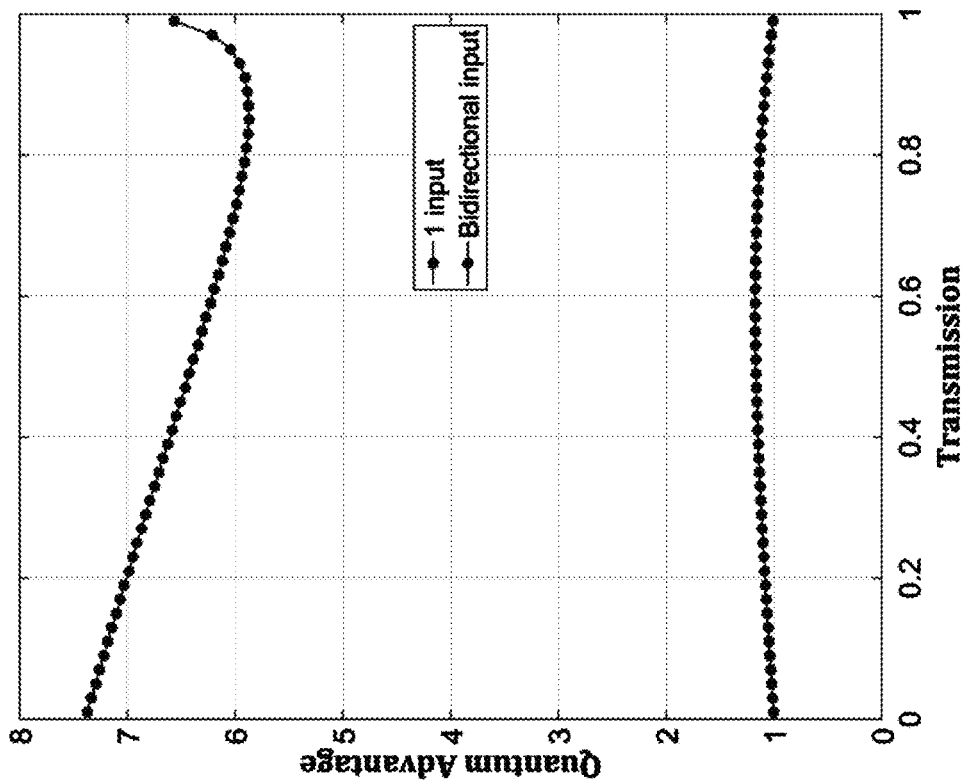
FIGS. 7A and 7B show modeling results of measurements in a two-phase interferometer.
Figure 7A:
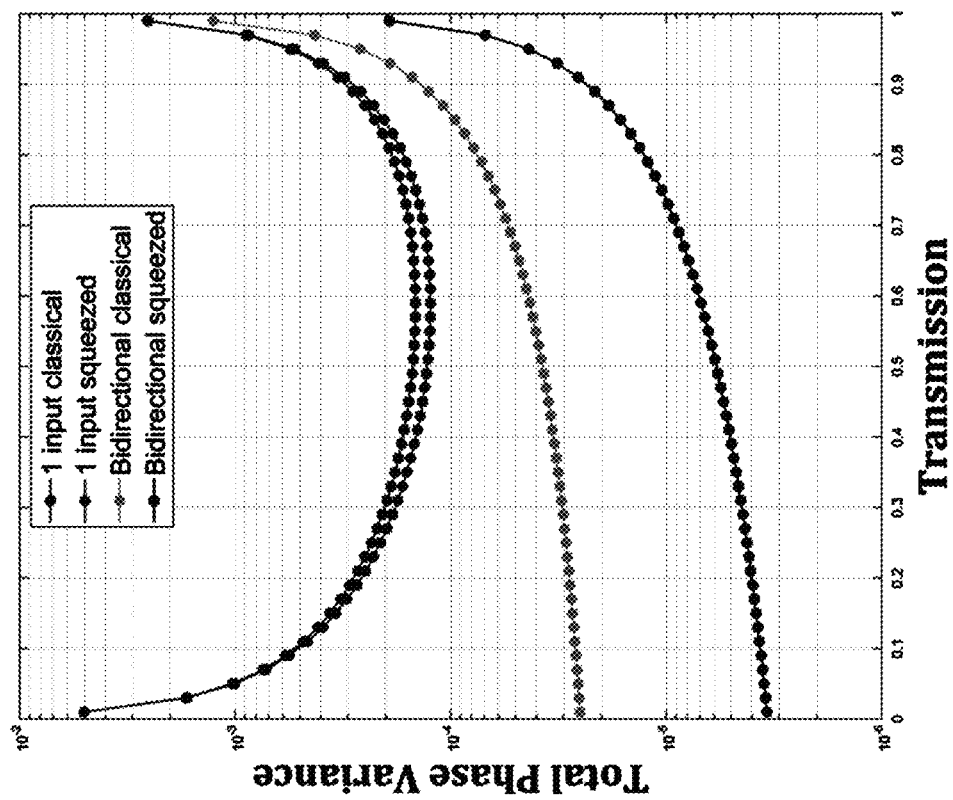

FIGS. 7A and 7B show modeling results of measurements in a two-phase interferometer. FIG. 7A shows total phase variance of the measurements, plotted as a function of reflector transmission T for one or bidirectional input and for classical or squeezed light. FIG. 7B on the right shows the calculated quantum advantage Q as extracted from the data in left plot, showing a substantial advantage to using bidrectional input with the cascaded phase sensing approach.

As shown in the plot of FIG. 7A, for the single input use case, the total measurement variance diverges at T=0 and at T=1 for both classical and quantum (i.e., squeezed light) inputs. Near T=0, the divergence is likely due to a very weak measurement for $\phi_2$, since very little light is transmitted through the reflector to pass through $\phi_2$. Near T=1, the divergence is likely attributable to the fact that almost no light is reflected such that the only measurable data is on $\phi_1+\phi_2$, with virtually no distinguishing information between the two phases. In other words, the two phases so measured are highly correlated. Moreover, in FIG. 7B, the calculated quantum advantage from a single input is at most 1.17 near T=0.63, in this embodiment. This result is likely due to the fact that the reflector splits the one input into two modes and introduces vacuum noise into the state, effectively reducing the squeezing strength for the measurement.

The two-input, or bidirectional input case, shows substantially better theoretical performance. While the measurement variances still diverge near T=1 for the same reason as the single input case, the variances do not diverge near T=0. This effect is likely due to the fact that, at T=0, the system essentially functions as two separate interferometers, each independently measuring $\phi_1$ or $\phi_2$, as also reflected in the quantum advantage calculation, which starts at its limit near T=0. The quantum advantage remains high for all T in the bidirectional input use case because squeezed light is likely interfering with more squeezed light, instead of vacuum noise, at the reflector. Thus, there is no effective loss of squeezing in the bidirectional input case. Some reduction in quantum advantage is expected, as the optimal points for measuring $\phi_1$ and $\phi_2$ are different for intermediate values of T, thus the chosen measurement makes some compromise between the two optimal points.

Overall, the modeling results indicate, despite the two phases being correlated in the output state, one can still measure both phase values simultaneously with a substantial quantum advantage. A key factor in the successful measurement appears to be to avoid interaction with vacuum noise by introducing more squeezed light at every reflector such that light from two directions interfere.

Let the interferometer be setup to initially measure phases in an optimal way that achieves a quantum advantage in sensitivity of $e^{2r}$. Phase drifts in the signal arm will cause the phase shifts in the sensor to change. Homodyne detection gives us both amplitude and phase from each reflection (temporal mode). We store this as a vector $\bar{R}_{out}$ and compare it to the expected $\bar{R}$ from a model that uses the current state of the sensor. The phase shifts between reference and signal arms $\phi_{r,i} - \phi_i$ are calculated from the difference between these two vectors, weighted by how sensitive each component of $\bar{R}_{out}$ is to $\phi_i$. The reference arm is adjusted, either by piezoelectric elements or a temperature change, to zero out the phase differences and return the interferometer to its most sensitive position.

Figure 8A:
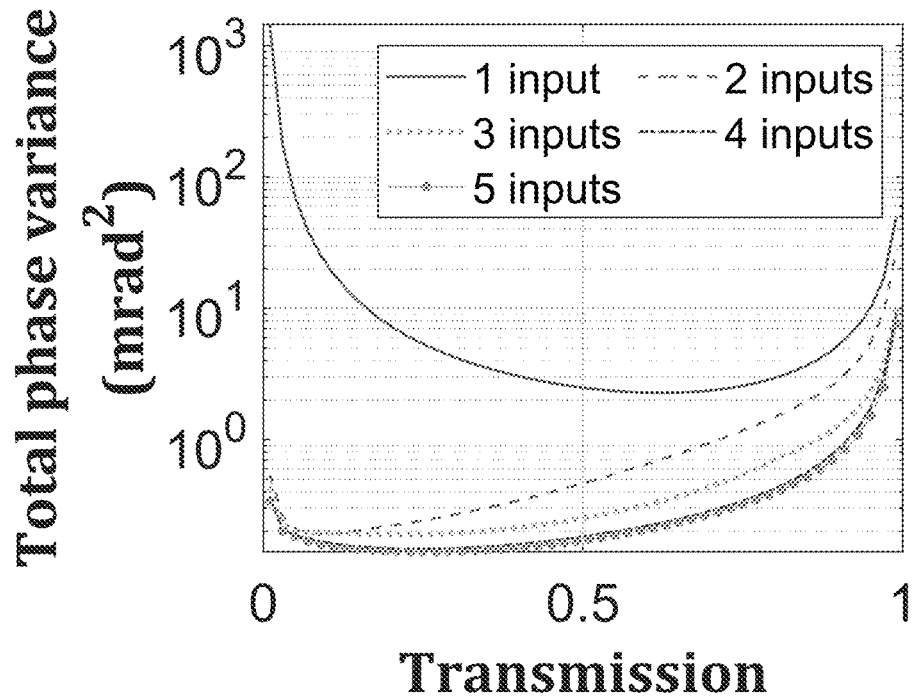
FIG. 8A is a plot showing the total phase variance from 1-5 squeezed coherent state inputs, but not the classical equivalents.
Figure 8B:
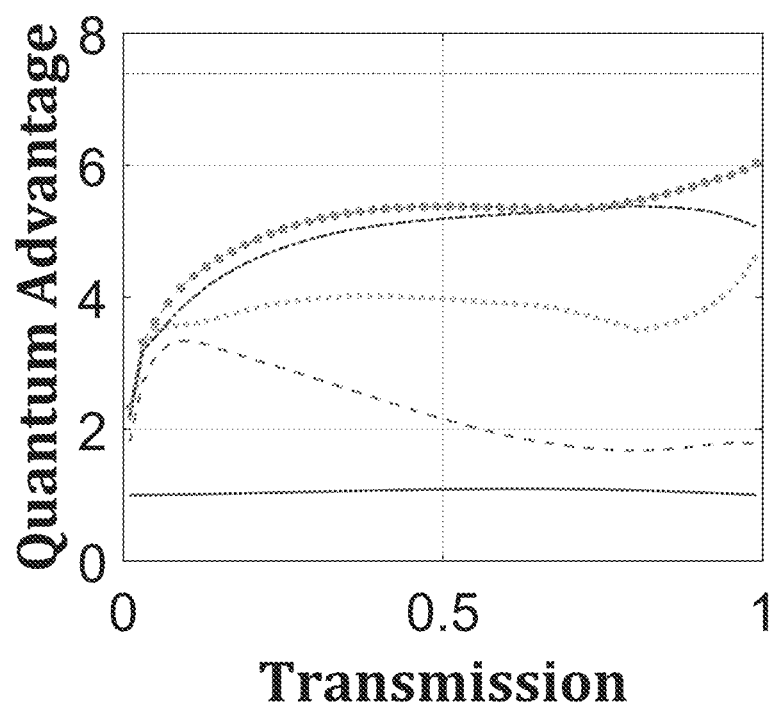
FIG. 8B is a plot showing the corresponding quantum advantage curves for each number of inputs.

FIGS. 8A and 8B are plots showing performance of a three-phase, bidirectional interferometer, such as those shown in FIGS. 4A and 5, with traces showing the enhancement up to five input pulses. FIG. 8A is a plot of the total phase sensitivity in a three phase, bidirectional interferometer with up to five sequential displaced squeezed state inputs. The magnitude of $|\alpha|$ reduces with each added pulse to keep the total input photon number constant at 103. FIG. 8B is a plot showing the quantum advantage Q obtained from sequentially inputting up to five displaced squeezed states. The quantum advantage is shown to increase with more input pulses, asymptotically approaching the limit set by the amount of vacuum noise in the system.

FIGS. 8A and 8B show the total phase variance and quantum advantage from using a varying number of inputs. A single input gives a Q of at most 9.5% at T=0.62. However, with a second input, the light has one fewer interactions with vacuum noise, and so the sensor shows a stronger quantum advantage as well as a lower phase variance.

A third pulse adds a smaller enhancement, and more inputs show more diminishing returns on the sensitivity and quantum advantage. With more pulses comes greater ambiguity in which phase caused which output mode to have a phase shift, leading to relatively lower distinguishing information. Also, more pulses require a longer measurement period, which is not accounted for in this analysis.

Figures 9A, 9B, 9C:
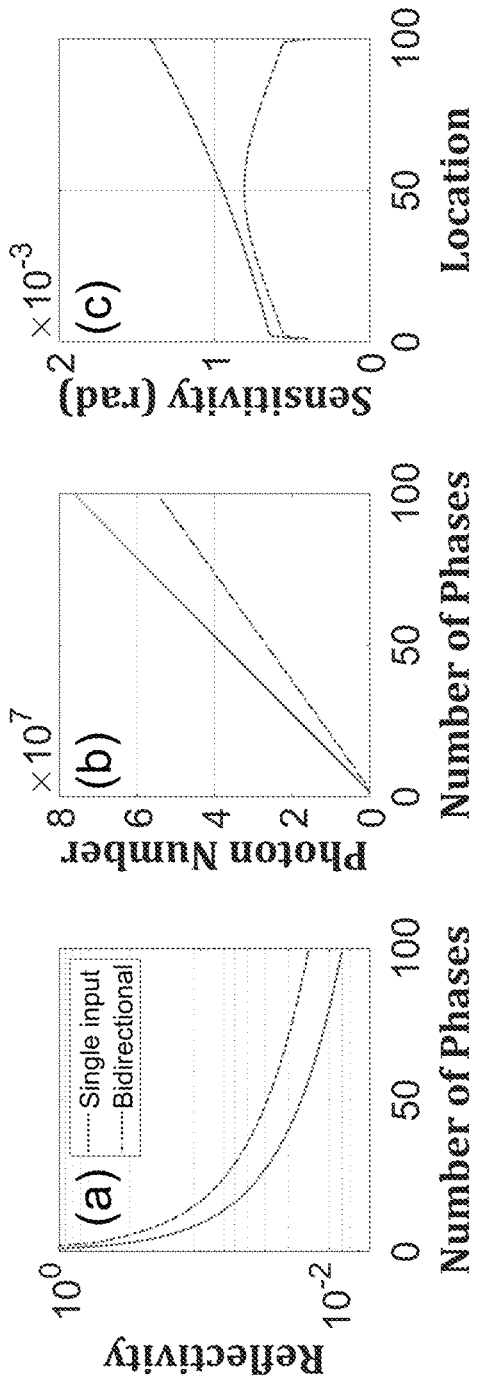
FIGS. 9A-9C illustrate modelling a sensor with up to 100 phases and classical light.

FIGS. 9A-9C illustrate of modeling a sensor with up to 100 phases and classical light with two scenarios. The single input uses a single pulse from one side for measurement, while the bidirectional case uses two pulses, one from each side, for measurement. FIG. 9A plots optimal reflectivity Ropt=1-Topt of the partial reflectors as a function of the number of phases N in that sensor. FIG. 9B plots required power, or photon number, required to reach an average phase variance of 1mrad2, as a function of the number of phases in the sensor. FIG. 9C plots distribution of of the phase sensitivity of each phase in the sensor for N=100.

Figure 10A:
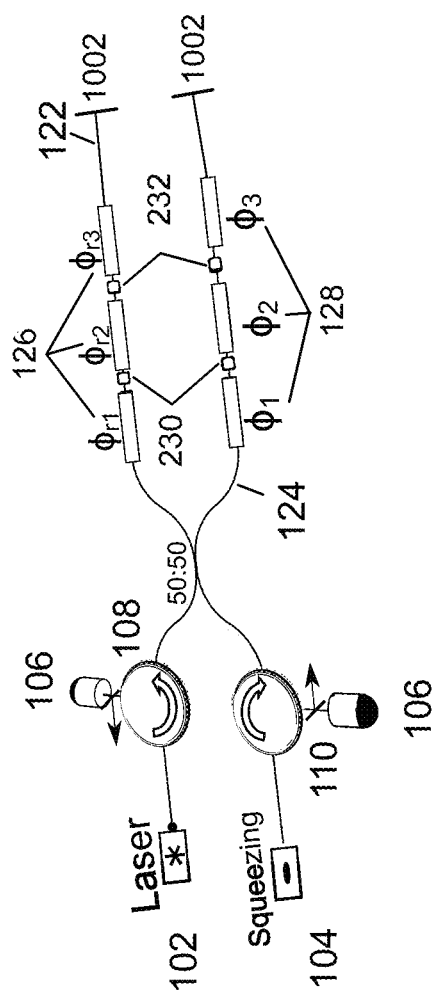
FIG. 10A is a sensor similar to that of FIG. 4A, except that mirrors replace the inputs on the far side of the interferometer.
Figure 10B:
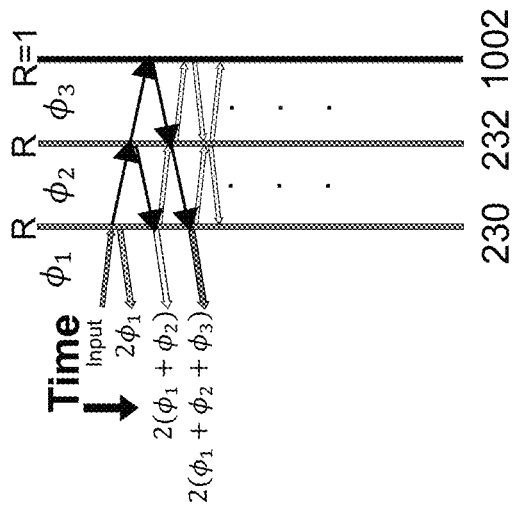
FIG. 10B shows corresponding timing dynamics of a single pulse entering the sensing arm of this structure.

FIG. 10A is a sensor similar to that of FIG. 4A, except that mirrors replace the inputs on the far side of the interferometer. This is an embodiment of the sensor with two reflectors, three phases, and a mirror at the end or two mirrors as shown here). The mirror further compacts the sensor so that the sensor only needs input and detectors on one side. FIG. 10B shows corresponding timing dynamics of a single pulse entering the sensing arm of this structure, the resulting reflections, and what information those reflections contain.

It is recognized that the cascaded phase sensor approach likely does not infinitely scale to an arbitrarily high number of phases. For a meaningful quantum advantage, the number of input phase-locked squeezed pulses scales alongside N, which may become experimentally challenging. Additional issues may be encountered with coherence, dispersion, and propagation loss of the input pulses. For instance, a standard smf28 fiber operating with 1550 nm light exhibits a dispersion of around 18 ps/nm/km and a propagation loss of 0.2 dB/km. Alternatively, photonic crystal fiber or a hollow-core fiber may provide reduced propagation losses comparable to those of solid-core fibers as well as much lower dispersion and thermal noise (see, for example, the Lloyd reference mentioned above, and Sakr, et al., "Hollow Core NANFs with Five Nested Tubes and Record Low Loss at 850, 1060, 1300 and 1625 nm," Optical Fiber Communication Conference (OFC) 2021, Optica Publishing Group, Washington, D.C. (2021)). Distributed sensing with such a fiber may provide improved range and performance in the future.

One may also borrow more methods from classical fiber sensing, in which some use the embedded Bragg reflectors themselves as the sensing element. In such approaches, strain or temperature changes will change the reflectivity spectrum of each reflector, enabling phase characterizations. Such approaches would have the distinct advantage of requiring tunable, continuous wave (CW) light to scan through the different reflectivity peaks of each Bragg reflector. In this case, since the input source would have a long coherence length, the total range of the sensor could be several kilometers.

The embodiments described above provide a sensor layout for distributed (i.e., cascaded) phase sensing based in optical fiber. The innovative architecture is based on a single optical fiber interferometer measuring phases cascaded in series. Simulations show that the sensor can nearly achieve the maximum possible quantum advantage for phase sensing, providing a new paradigm in photonic quantum metrology wherein multiple parameters share an optical path. This approach also has direct potential to enhance a variety of optical fiber sensors, since the technique is similar to that of a distributed fiber sensor.

In an embodiment, this approach features embedded, evenly spaced Bragg reflectors for defining phase sensing regions, and bidirectional input for effective use of a quantum light source, such as squeezed light. Pulses of squeezed light are input from both sides at intervals equal to the propagation time between reflectors, so that separate pulses hit reflectors simultaneously. Interfering squeezed pulses generated at different times on the reflectors effectively multiplexes the number of squeezed sources. Detectors perform ideal homodyne detection in each time interval, so that distinguishing information is obtained on each phase depending on the time of arrival. In this way, the approach described herein enable performance of quantum-enhanced multiparameter quantum metrology, where measurable optical phases are cascaded in series.

Despite the cascaded phases being highly correlated in the output, the use of squeezed light can give close to a full quantum advantage in phase sensing. Methods from continuous-variable quantum computing were used to model the sensor and evaluate performance. While the theoretical results are shown above for two and three phase sensors, this approach may in principle scale to many more phases. This sensing protocol offers a new perspective for distributed fiber sensing as well as multiparameter quantum metrology. The sensor layout may also have implications for generating exotic photonic entangled states and potentially for boson sampling. Indeed, the proposed research has the unusual potential to advance two distinct fields: continuous-variable (CV) computing and quantum sensing, both with broad implications in security, computing, disaster prevention and energy.

For instance, the cascaded phase sensing approach described above may be used to dramatically improve Gaussian boson sampling. Gaussian boson sampling is one of the most promising avenues for demonstrating a quantum advantage. However, it has only been demonstrated in free space, which requires a complex setup that is difficult to scale. This problem may be solved by sampling in fiber, as in the approach described above. Rather than increasing resources (such as quantum light sources, interferometers, and detectors), the cascaded phase sensing approach described above offers an exponential improvement in sampling time.

In any optical sensor, the precision of a measurement is limited by shot noise ($1/\sqrt{n}$), where N is the number of photons. However, squeezed light can enhance precision by $e^{2r}$, where r is the squeezing parameter. The cascade phase sensing system described above leverages reflectors embedded in fiber to demonstrate excellent improvement in performance from quantum fiber sensors. This same approach may be used to implement Gaussian boson sampling in fiber with 10× to 100× reduction of resources compared with the free space demonstration cited above, while providing significantly faster measurement times. That is, unlike the 100 modes in the free-space demonstration, our approach is scalable up to thousands or millions of modes. Increasing the number of modes will linearly increase the number of photons, which will exponentially decrease the time required to collect a sufficient number of photons for use in quantum computing operations.

The terms and expressions employed herein are used as terms and expressions of description and not of limitation, and there is no intention, in the use of such terms and expressions, of excluding any equivalents of the features shown and described or portions thereof. Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, by way of example only, the disclosure of a "protrusion" should be understood to encompass disclosure of the act of "protruding"—whether explicitly discussed or not—and, conversely, were there only disclosure of the act of "protruding", such a disclosure should be understood to encompass disclosure of a "protrusion". Such changes and alternative terms are to be understood to be explicitly included in the description.

The previous description of the disclosed embodiments and examples is provided to enable any person skilled in the art to make or use the present invention as defined by the claims. Thus, the present invention is not intended to be limited to the examples disclosed herein. Various modifications to these embodiments will be readily apparent to those skilled in the art, and the generic principles defined herein may be applied to other embodiments without departing from the spirit or scope of the invention as claimed.

What is claimed is:

1. A system for sensing phase changes in a medium comprising:
   a bidirectional interferometer having—
      a reference arm and a sensing arm,
      two inputs at each of two ends of the interferometer, and
      a circulator disposed between each input and the interferometer; and
   sources for providing squeezed light pulses at a first input at each of the two ends of the interferometer;
   spaced-apart partial reflectors disposed between the two sources along the arms; and
   detectors associated with each input;
   wherein circulators pass the squeezed light pulses from the sources to the interferometer and route reflections of pulses to the detectors.

2. The system of claim 1, further comprising sources of classical pulses at a second input at each of the two ends of the interferometer, wherein the circulators pass the classical pulses to the interferometer, and wherein the classical pulses and the squeezed light pulses combine to form squeezed laser light.

3. The system of claim 2 wherein the interferometer is a Mach-Zehnder interferometer having a fiber sensing arm and a fiber reference arm and wherein similar partial reflectors are disposed with similar spacing along each arm.

4. The system of claim 2 wherein the sensing arm and the reference arm are common and further comprising polarizing beam splitters configured to combine the pulses and to separate outputs into orthogonal polarizations.

5. The system of claim 2 further comprising a cavity-based generator of squeezed vacuum pulses, and a pulse picker for providing alternating squeezed vacuum pulses to the first input at each of the two ends of the interferometer.

6. The system of claim 5 wherein the cavity based generator is an optical parametric oscillator.

7. The system of claim 2 further comprising a laser for generating the classical pulses and a beam splitter for providing classical pulses to the second input at each of the two ends of the interferometer.

8. The system of claim 1 having two partial reflectors along each arm to form a three-phase sensor.

9. The system of claim 1 forming an N phase sensor having N–1 spaced-apart partial reflectors in each arm.

10. The system of claim 1 wherein the medium is free space.

11. The system of claim 1 wherein the medium is optical fiber.

12. The system of claim 1 configured to detect multiple material properties including temperature and strain.

13. The system of claim 2 wherein the detectors are photodetectors and configured to use balanced homodyne detection.

14. A system for sensing phase changes in a medium comprising:
an interferometer having—
a reference arm and a sensing arm,
a first input at a first end of one of either the reference arm or the sensing arm of the interferometer,
a second input at a first end of the other of either the reference arm or the sensing arm of the interferometer,
a mirror at the second end of the reference arm and at the second end of the sensing arm, and
a circulator disposed between each input and the interferometer; and
a source for providing squeezed light pulses at the first input;
a source for providing laser pulses at the second input;
spaced-apart partial reflectors disposed between the inputs and the mirror along the reference arm and the sensing arm; and
detectors associated with each input;
wherein circulators pass squeezed light pulses and laser pulses into the interferometer, and route reflections of pulses to the detectors.

15. The system of claim 14 wherein the interferometer is a Mach-Zehnder interferometer having a fiber sensing arm and a fiber reference arm and wherein similar partial reflectors are disposed with similar spacing along each arm.

16. The system of claim 14 wherein the sensing arm and the reference arm are common and further comprising polarizing beam splitters configured to combine the light pulses from the inputs and to separate outputs into orthogonal polarizations.

17. The system of claim 14 further comprising a cavity-based generator of squeezed light pulses, and a pulse picker for providing alternating squeezed light pulses to the first input.

18. The system of claim 17 wherein the cavity based generator is an optical parametric oscillator.

19. The system of claim 14 further comprising a laser for generating the classical pulses and a beam splitter for providing classical pulses to the second input.

* * * * *